US009602925B2

(12) United States Patent
Chukka et al.

(10) Patent No.: US 9,602,925 B2
(45) Date of Patent: Mar. 21, 2017

(54) MULTI-STREAM-MULTIPOINT-JACK AUDIO STREAMING

(71) Applicant: Intel Corporation, Santa Clara, CA (US)

(72) Inventors: Ravikiran Chukka, Beaverton, OR (US); Rajesh Poornachandran, Portland, OR (US); Gyan Prakash, Beaverton, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/709,177

(22) Filed: May 11, 2015

(65) Prior Publication Data

US 2015/0358733 A1 Dec. 10, 2015

Related U.S. Application Data

(63) Continuation of application No. 13/997,764, filed as application No. PCT/US2011/067486 on Dec. 28, 2011, now Pat. No. 9,031,226.

(51) Int. Cl.
*H04M 11/00* (2006.01)
*H04R 3/12* (2006.01)
(Continued)

(52) U.S. Cl.
CPC .............. *H04R 3/12* (2013.01); *H04K 1/00* (2013.01); *H04L 65/1093* (2013.01);
(Continued)

(58) Field of Classification Search
CPC ... H04R 3/12; H04L 65/1093; H04L 65/4069; H04M 3/493
See application file for complete search history.

(56) References Cited

U.S. PATENT DOCUMENTS 7,633,963 B1 12/2009 Anderson et al.
2003/0161292 A1 8/2003 Silvester
(Continued)

FOREIGN PATENT DOCUMENTS

CN 101401452 A 4/2009
KR 1020070070528 A 7/2007
WO 2013100933 A1 7/2013

OTHER PUBLICATIONS

International Search Report and Written Opinion received for International Application No. PCT/US2011/067486, mailed Aug. 30, 2012, 9 pages.
(Continued)

*Primary Examiner* — Simon King
(74) *Attorney, Agent, or Firm* — Barnes & Thornburg LLP (57) ABSTRACT

A method and device for streaming the output of one or more audio sources to one or more smart headsets includes establishing a secure connection with a smart headset, associating an audio channel of the one or more audio sources with the smart headset, and streaming the associated audio channel to the smart headset. The audio streaming device may selectively stream one or more audio channels from one or more audio sources to one or more of the smart headsets as a function of a streaming policy.

17 Claims, 3 Drawing Sheets

(51) Int. Cl.
*H04R 1/10* (2006.01)
*H04L 29/06* (2006.01)
*H04W 12/06* (2009.01)
*H04K 1/00* (2006.01)
*H04W 4/00* (2009.01)

(52) U.S. Cl.
CPC .......... *H04L 65/4069* (2013.01); *H04L 65/60* (2013.01); *H04R 1/1091* (2013.01); *H04W 4/008* (2013.01); *H04W 12/06* (2013.01)

(56) References Cited

U.S. PATENT DOCUMENTS

| | | |
|---|---|---|
| 2005/0271194 A1 | 12/2005 | Woods et al. |
| 2006/0166716 A1* | 7/2006 | Seshadri ............. H04M 1/6033 455/575.2 |
| 2007/0067552 A1 | 3/2007 | Toporski |
| 2007/0206829 A1 | 9/2007 | Weinans et al. |
| 2007/0242834 A1 | 10/2007 | Coutinho et al. |
| 2008/0273692 A1 | 11/2008 | Buehl |

OTHER PUBLICATIONS

European Search Report for Application No. 11878944.5-1853, dated Sep. 4, 2015, 9 pages.
Office Action for Chinese Application No. 201180075914.9, dated Jun. 8, 2016, 13 pages.
Office Action for Chinese Application No. 201180075914.9, dated Nov. 2, 2015, 11 pages.
Office Action for Chinese Patent Application No. 201180075914.9, dated Sep. 30, 2016, 3 pages.

\* cited by examiner

MULTI-STREAM-MULTIPOINT-JACK AUDIO STREAMING

CROSS-REFERENCE TO RELATED APPLICATION

The present application is a continuation application of U.S. application Ser. No. 13/997,764, entitled "MULTI-STREAM-MULTIPOINT-JACK AUDIO STREAMING," which was filed on Jun. 25, 2013.

BACKGROUND

Portable computing devices have become ubiquitous with everyday life so much so that an increasing number of people carry at least one portable device with them at all times. Many of these devices include functionality that enables a user to listen to audio content from a variety of audio sources. For example, various portable computing devices enable the user to listen to digital music files, AM/FM radio stations, Internet radio stations, etc. However, due to physical design and cost considerations, portable computing devices are typically limited to providing audio content from a single audio source to one or two headsets. That is, conventional portable computing devices are limited to providing the same audio content to one or two headsets.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects or links between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 1:
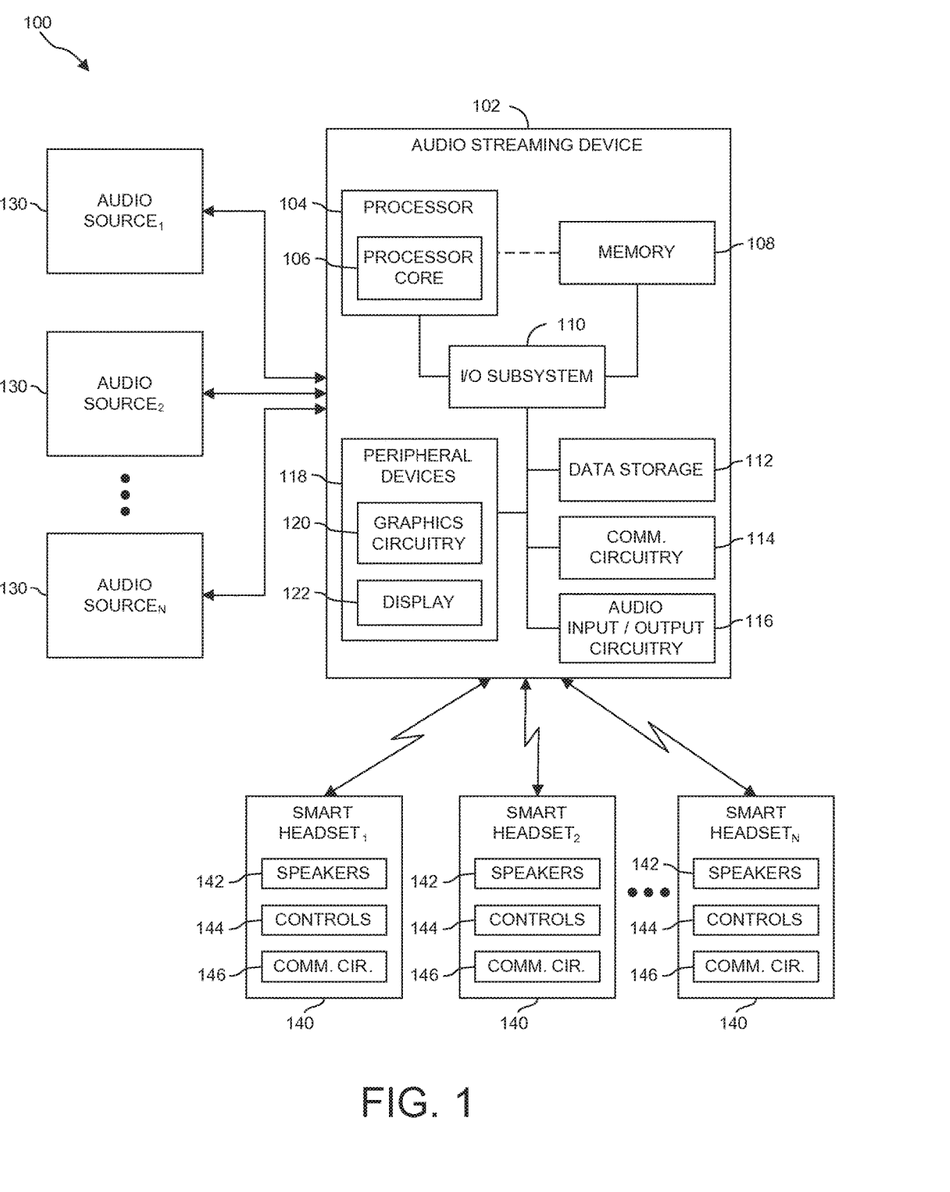
FIG. 1 is a simplified block diagram of at least one embodiment of a system for streaming the output of one or more audio sources to one or more smart headsets.

Referring now to FIG. 1, a system 100 for streaming the output of one or more audio sources to one or more smart headsets includes an audio streaming device 102, one or more audio sources (e.g., AUDIO SOURCE$_1$, AUDIO SOURCE$_2$ ... AUDIO SOURCE$_N$) 130, and one or more smart headsets (e.g., SMART HEADSET$_1$, SMART HEADSET$_2$ ... SMART HEADSET$_N$) 140. In use, as discussed in more detail below, the audio streaming device 102 encodes audio output channels by one or more audio sources 130. Each encoded audio channel may then be selectively streamed to separate smart headsets 140 or to a group of smart headsets 140 wirelessly. Additionally or alternatively, two or more encoded audio channels may be simultaneously streamed to the smart headsets 140 or intermittently streamed to the smart headsets 140.

The audio streaming device 102 may be embodied as any type of computing device capable of performing the functions described herein. For example, the audio streaming device 102 may be embodied as a desktop computer, a laptop computer, a mobile internet device, a handheld computer, a smart phone, a tablet computer, a personal digital assistant, a telephony device, or other computing device. In one particular embodiment, the audio streaming device 102 is embodied as a portable audio player. In the illustrative embodiment of FIG. 1, the audio streaming device 102 includes a processor 104, an I/O subsystem 110, a memory 108, a data storage device 112, and one or more peripheral devices 118. In some embodiments, several of the foregoing components may be incorporated on a motherboard of the audio streaming device 102, while other components may be communicatively coupled to the motherboard via, for example, a peripheral port. Furthermore, it should be appreciated that the audio streaming device 102 may include other components, sub-components, and devices commonly found in an audio player, audio streaming device, and/or computing device, which are not illustrated in FIG. 1 for clarity of the description.

The processor 104 of the audio streaming device 102 may be embodied as any type of processor capable of executing software/firmware, such as a microprocessor, digital signal processor, microcontroller, or the like. The processor 104 is illustratively embodied as a single core processor having a processor core 106. However, in other embodiments, the processor 104 may be embodied as a multi-core processor having multiple processor cores 106. Additionally, the audio streaming device 102 may include additional processors 104 having one or more processor cores 106.

The I/O subsystem 110 of the audio streaming device 102 may be embodied as circuitry and/or components to facilitate input/output operations with the processor 104 and/or other components of the audio streaming device 102. In some embodiments, the I/O subsystem 110 may be embodied as a memory controller hub (MCH or "northbridge"), an input/output controller hub (ICH or "southbridge"), and a firmware device. In such embodiments, the firmware device of the I/O subsystem 110 may be embodied as a memory device for storing Basic Input/Output System (BIOS) data and/or instructions and/or other information (e.g., a BIOS driver used during booting of the audio streaming device 102). However, in other embodiments, I/O subsystems having other configurations may be used. For example, in some embodiments, the I/O subsystem 110 may be embodied as a platform controller hub (PCH). In such embodiments, the memory controller hub (MCH) may be incorporated in or otherwise associated with the processor 104, and the processor 104 may communicate directly with the memory 108 (as shown by the hashed line in FIG. 1). Additionally, in other embodiments, the I/O subsystem 110 may form a portion of a system-on-a-chip (SoC) and be incorporated, along with the processor 104 and other components of the audio streaming device 102, on a single integrated circuit chip.

The processor 104 is communicatively coupled to the I/O subsystem 110 via a number of signal paths. These signal paths (and other signal paths illustrated in FIG. 1) may be embodied as any type of signal paths capable of facilitating communication between the components of the audio streaming device 102. For example, the signal paths may be embodied as any number of wires, cables, light guides, printed circuit board traces, via, bus, intervening devices, and/or the like.

The memory 108 of the audio streaming device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 108 is communicatively coupled to the I/O subsystem 110 via a number of signal paths. Various data and software may be stored in the memory device 108. For example, one or more operating systems, applications, programs, libraries, and drivers that make up the software stack executed by the processor 104 may reside in memory 108 during execution. Furthermore, software and data stored in memory 108 may be swapped between the memory 108 and the data storage device 112 as part of memory management operations.

In some embodiments, the audio streaming device 102 may include additional memory devices 108. For example, the audio streaming device 102 may include a secure memory device, which may store one or more encryption keys and/or licenses for decrypting or authorizing playback of protected media content. Although only one memory device 108 is illustrated in FIG. 1, the audio streaming device 102 may include any number of additional memory devices in other embodiments.

The audio streaming device 102 may also include data storage device(s) 112. The data storage device(s) 112 may be embodied as any type of device or devices configured for the short-term or long-term storage of data such as, for example, memory devices and circuits, memory cards, hard disk drives, solid-state drives, or other data storage devices. In some embodiments, the data storage device(s) 112 may store audio content for replay to a user of the audio streaming device 102. In such embodiments, the data storage device 112, and associated circuitry, may embodied one of the audio sources 130.

Additionally, the audio streaming device 102 may include communication circuitry 114 to facilitate communication with one or more remote computing devices over a network. The audio streaming device 102 may use any suitable communication protocol to communicate with other computing devices over the network depending on, for example, the particular type of network(s). For example, in some embodiments, the audio streaming device 102 may communicate with one or more of the audio sources 130, such as Internet radio stations, over the network.

In one illustrative embodiment of FIG. 1, the communication circuitry 114 may also include one or more radio frequency (RF) transceivers to facilitate wireless communication with the one or more smart headsets 140. In such embodiments, the one or more RF transceivers may comprise one or more Bluetooth® transceivers or any other short-range transceiver suitable for use in communicating with the one or more smart headsets 140. It should be understood that although only short-range transceivers are described in this illustrative embodiment, the audio streaming device 102 may comprise other types of transceivers in other embodiments. For example, in some embodiments, the audio streaming device 102 may comprise one or more long-range transceivers to facilitate wireless communication with the one or more smart headsets 140. Additionally, depending on of the type of transceiver used, the audio streaming device 102 may include one or more antennas. The antennas in some embodiments may be located inside of the audio streaming device 102, or they may be located external to the audio streaming device 102.

Although the communication circuitry 114 in the illustrative embodiment of FIG. 1 includes one or more RF transceivers to wirelessly communicate with the one or more smart headsets 140, it should be appreciated that the communication circuitry 114 may also include one or more components that facilitate wired communications with the one or more smart headsets 140 in other embodiments. For example, in an illustrative embodiment, the communication circuitry 114 may include components that facilitate communications with the one or more smart headsets 140 over a universal serial bus (USB) connection, an RS-232 connection, a physical parallel connection, or any other appropriate type of physical communication path. Of course, in embodiments in which the communication circuitry 114 includes components for wired communications with the one or more smart headsets 140, the headsets 140 may include corresponding components and circuitry.

Additionally, in embodiments wherein the communication circuitry 114 includes components for wired communications with the one or more smart headsets 140, the audio streaming device 102 may include one or more input/output jacks. The one or more input/output jacks in such embodiments may provide a physical connection and/or mechanism for receiving any number of wires, cables, light guides, printed circuit board traces, via, bus, intervening devices, and/or the like to communicatively couple the audio streaming device 102 with the one or more smart headsets 140. For example, in one embodiment, the audio streaming device 102 includes an input/output jack for connecting the one or more headsets 140 via a splitter. To do so, the splitter may comprise a first communication end and a second communication end. The first communication end of the splitter may include a wire and/or cable having a single termination point suitable for connection with the input/output jack of the audio streaming device 102. The second communication end of the splitter may include any number of input/output jacks for connecting the one or more headsets to the splitter. It should be understood that any suitable mechanism for connecting one or more headsets to an input/output jack of the audio streaming device 102 may be used. For example, the splitter may comprise multiple conductive cores, one core for each input/output jack included in the second communication end. In such examples, the multiple conductive cores of the splitter may form a connection with any number of contact points in the input/output jacks of the audio streaming device 102. It should be understood, however, that although a splitter having separate conductive cores is utilized in some embodiments, other mechanisms such as a bus or a switch may be used to physically connect the one or more smart headsets 140 to the audio streaming device 102 in other embodiments.

The audio streaming device 102 may also include audio input/output circuitry 116 to facilitate communications with the one or more audio sources 130. The audio input/output circuitry 116 may be embodied as or otherwise include any type of audio input/output circuitry capable of receiving audio content from the audio source(s) 130. As such, the particular structure of the audio input/output circuitry 116 may depend on the type of audio source 130. To do so, the audio input/output circuitry 116 may be communicatively coupled to the one or more audio sources 130 via a number of signal links. These signal links may be embodied as any type of signal path capable of facilitating communication between the audio input/output circuitry 116 of the audio streaming device 102 and the one or more audio sources 130. For example, the signal links may be embodied as any number of audio jacks, wires, cables, light guides, printed circuit board traces, via, bus, intervening devices, and/or the like.

The peripheral devices 118 of the audio streaming device 102 may include any number of peripheral or interface devices. For example, the peripheral devices 118 may include a display, a touch screen, a keyboard, a mouse, external speakers, and/or other peripheral devices. The peripheral devices 118 are communicatively coupled to the I/O subsystem 110 via a number of signal paths thereby allowing the I/O subsystem 110 and/or processor 104 to receive inputs from and send outputs to the peripheral devices 118. The particular devices included in the peripheral devices 118 may depend upon, for example, the intended use of the audio streaming device 102.

In the illustrative embodiment shown, the peripheral devices 118 includes graphics circuitry 120, embodied as a graphics processing unit of a graphics peripheral card, and a display 122. The graphics circuitry 120 may be used to perform various graphics processing functions such as accelerating the generation of graphics and the like. As such, the graphics circuitry 120 is typically used to support the generation of graphics on the display 122 of the audio streaming device 102. However, the graphics circuitry 120 may also be used to process visual images captured by a camera of the audio streaming device 102 and/or perform other tasks for the audio streaming device 102. For example, the graphics circuitry 120 may execute software/firmware of the audio streaming device 102 in conjunction with or separate from the processor 104. In some embodiments, the processor 104 may also include the graphics circuitry 120 defined on a common die with the processor core 106.

The smart headsets 140 may be embodied as any type of portable device capable of reproducing sounds corresponding to the one or more audio channels described below. To do so, the smart headset 140 may include various components typically found in a headset device. For example, the smart headsets 140 may include one or more loudspeakers 142 for reproducing sounds from a signal source. The smart headsets 140 may also include communication circuitry 146 to facilitate communication with the audio streaming device 102. For example, similar to the audio streaming device 102, the smart headsets 140 may include any number of Bluetooth® transceivers or any other short-range transceiver suitable for use in communicating data and/or control signals with the audio streaming device 102. Additionally, the smart headsets 140 may also comprise one or more internal or external antennas to facilitate communication via the short-range transceivers. In some embodiments, the smart headsets 140 may also include control circuitry 144 to allow a user of the smart headset 140 to control various features of the headset 140 such as the volume, selection of an audio channel of a plurality of audio channels received from the audio streaming device, and so forth. In such embodiments, the control circuitry 144 may be embodied as one or more processors, associated memory, I/O subsystems, data storage devices, and/or various peripheral devices, each of which may be similar to or different from the corresponding devices of the audio streaming device 102 described above.

The audio sources 130 may be embodied as any type of audio source capable of providing one or more audio channels or signals to the audio streaming device 102 as described below. To do so, the audio sources 130 may include various components typically found in an audio device. For example, the audio sources 130 may include circuitry for receiving analog or digital radio stations in some embodiments. Other audio sources 130 may comprise components for playing Internet radio stations, compact discs, digital audio files, audible alerts and notifications produced by one or more computing devices, and any other sound reproducible from a signal. In some embodiments, the audio sources 130 may include components similar to those described above in relation to the audio streaming device 102. In such embodiments, the audio sources 130 may include a processor, a memory, an I/O subsystem, a data storage device, communication circuitry, and one or more peripheral devices. The audio sources 130 may also include audio input/output circuitry to facilitate communications with the audio streaming device 102. To do so, the audio input/output circuitry may be communicatively coupled to the audio streaming device 102 via a number of signal links. These signal paths may be embodied as any type of signal link capable of facilitating communication between the audio input/output circuitry of the one or more audio sources 130 and the audio streaming device 102. For example, the signal links may be embodied as any number of audio jacks, wires, cables, light guides, printed circuit board traces, via, bus, intervening devices, and/or the like. It should be understood that although the audio sources 130 are shown as being separate from the audio streaming device 102 in the illustrative embodiment of FIG. 1, one or more of the audio sources 130 may form a part of the audio streaming device 102 in other embodiments. For example, in embodiments where the audio source 130 is embodied as an FM receiver, the FM receiver may form a part of the audio streaming device 102.

Figure 2:
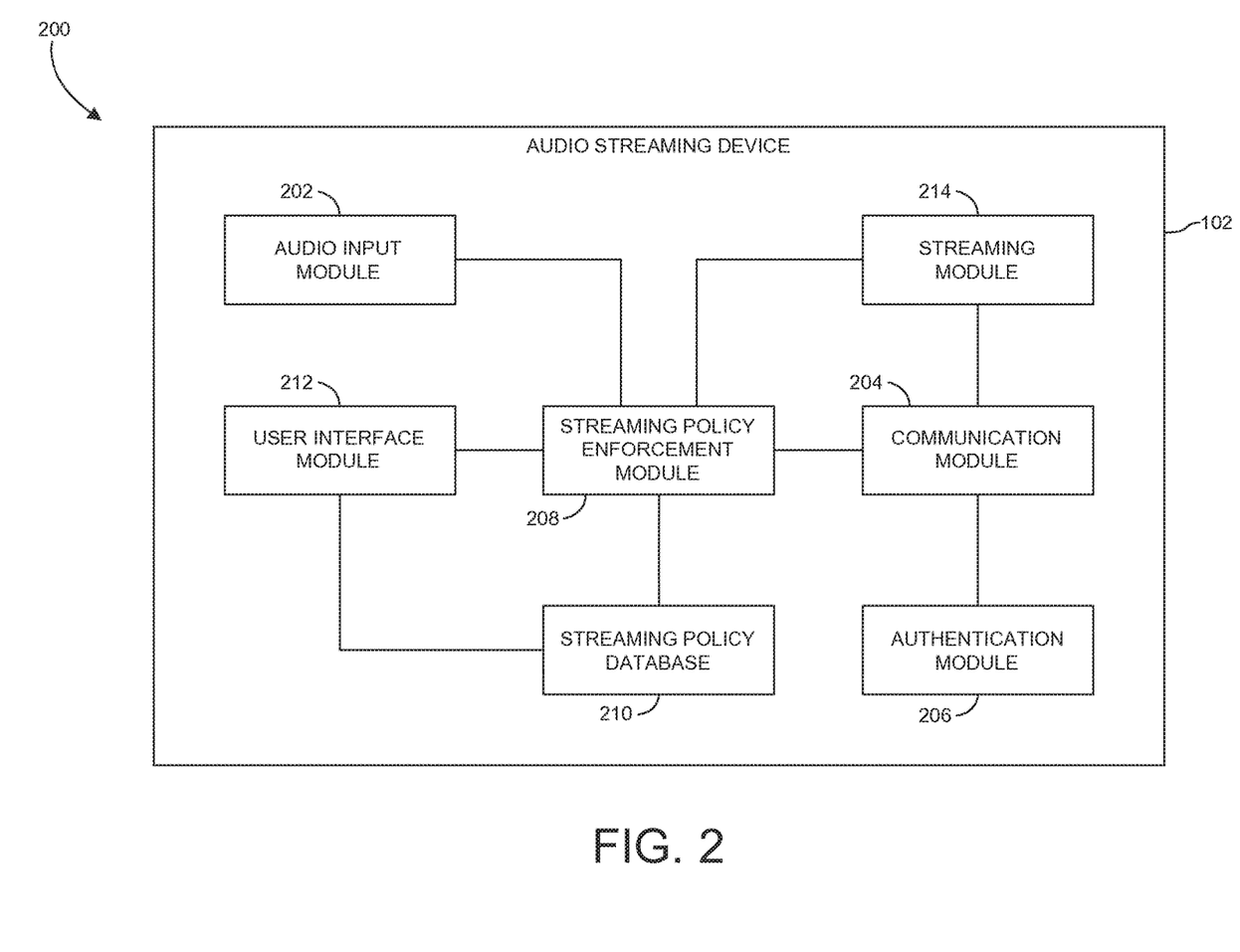
FIG. 2 is a simplified block diagram of at least one embodiment of a software environment of the audio streaming device of FIG. 1.

Referring now to FIG. 2, one embodiment of a software environment 200 of the audio streaming device 102 includes an audio input module 202, a communication module 204, an authentication module 206, a streaming policy enforcement module 208, a streaming policy database 210, a user interface module 212, and a streaming module 214. Of course, it should be appreciated that the audio streaming device 102 may include other components, sub-components, modules, and devices commonly found in an audio streaming device, which are not illustrated in FIG. 2 for clarity of the description.

In use, the communication module 204 facilitates communications with the one or more smart headsets 140 using Bluetooth® communication protocols. It should be understood that although Bluetooth® communication protocols are used in the illustrative embodiment, other short-range communication protocols may be used in other embodiments.

The communication module 204 may be communicatively coupled with the authentication module 206 to facilitate pairing and joining with the one or more smart headsets 140. In use, the authentication module 206 may exchange authentication credentials with the one or more smart headsets 140 to establish a secure communication channel therebetween. It should be understood that although authentication module 206 exchanges separate authentication credentials with each smart headset 140 in the illustrative embodiment, the authentication module 206 may use any suitable mechanism for exchanging any number of authentication credentials with the one or more smart headsets 140.

The streaming policy database 210 may be stored in the data storage device 112 of the audio streaming device 102 and store a streaming policy and/or one or more rules to be enforced when streaming an audio channel to one or more of the smart headsets 140. In some embodiments, the streaming policy database 210 may be embodied as or otherwise include one or more tables to rules and/or information corresponding to each smart headset 140 and each audio channel of the audio sources 130.

The audio input module 202 may be communicatively coupled to one or more audio sources 130 via a number of signal paths. In use, the audio input module 202 provides an interface to receive one or more separate audio channels from the one or more audio sources 130. In some embodiments, the audio input module 202 may be communicatively coupled to one or more audio jacks, wires, cables, light guides, printed circuit board traces, via, bus, and/or intervening devices of the audio streaming device 102.

The streaming policy enforcement module 208 is communicatively coupled to the audio input module 202 and the streaming policy database 210. In use, the streaming policy enforcement module 208 maps one or more audio channels to the one or more smart headsets 140 as a function of the streaming policy stored in the streaming policy database 210. For example, as described in greater detail below with reference to FIG. 3, the streaming policy enforcement module 208 may retrieve a streaming policy from the streaming policy database 210. In such embodiments, the streaming policy may comprise one or more rules that define which audio channels should be streamed to which smart headsets 140. Additionally or alternatively, the streaming policy enforcement module 208 may also enforce other rules dictating how one or more audio channels should be streamed to one or more of the smart headsets 140.

To facilitate interactions with the audio streaming device 102, the user interface module 212 may generate one or more user interfaces to be presented (i.e., through a display of the audio streaming device 102) to a user of the device. For instance, in some embodiments, the user interface module 212 may generate one or more user interfaces to enable the user to create and/or modify one or more rules of a streaming policy to be enforced by the streaming policy enforcement module 208. Additionally or alternatively, in other embodiments, the user interface module 212 may also generate one or more user interfaces to facilitate the pairing and joining of the one or more smart headsets 140 with the audio streaming device 102.

The streaming module 214 is communicatively coupled to the streaming policy enforcement module 208 and the communication module 204. In use, the streaming module 214 may encode each audio channel using the authentication credentials for each associated smart headset 140 as a function of the streaming policy enforced by the streaming policy enforcement module 208. After encoding each audio channel, the streaming module 214 may stream the encoded audio channels to one or more of the smart headsets 140.

Figure 3:
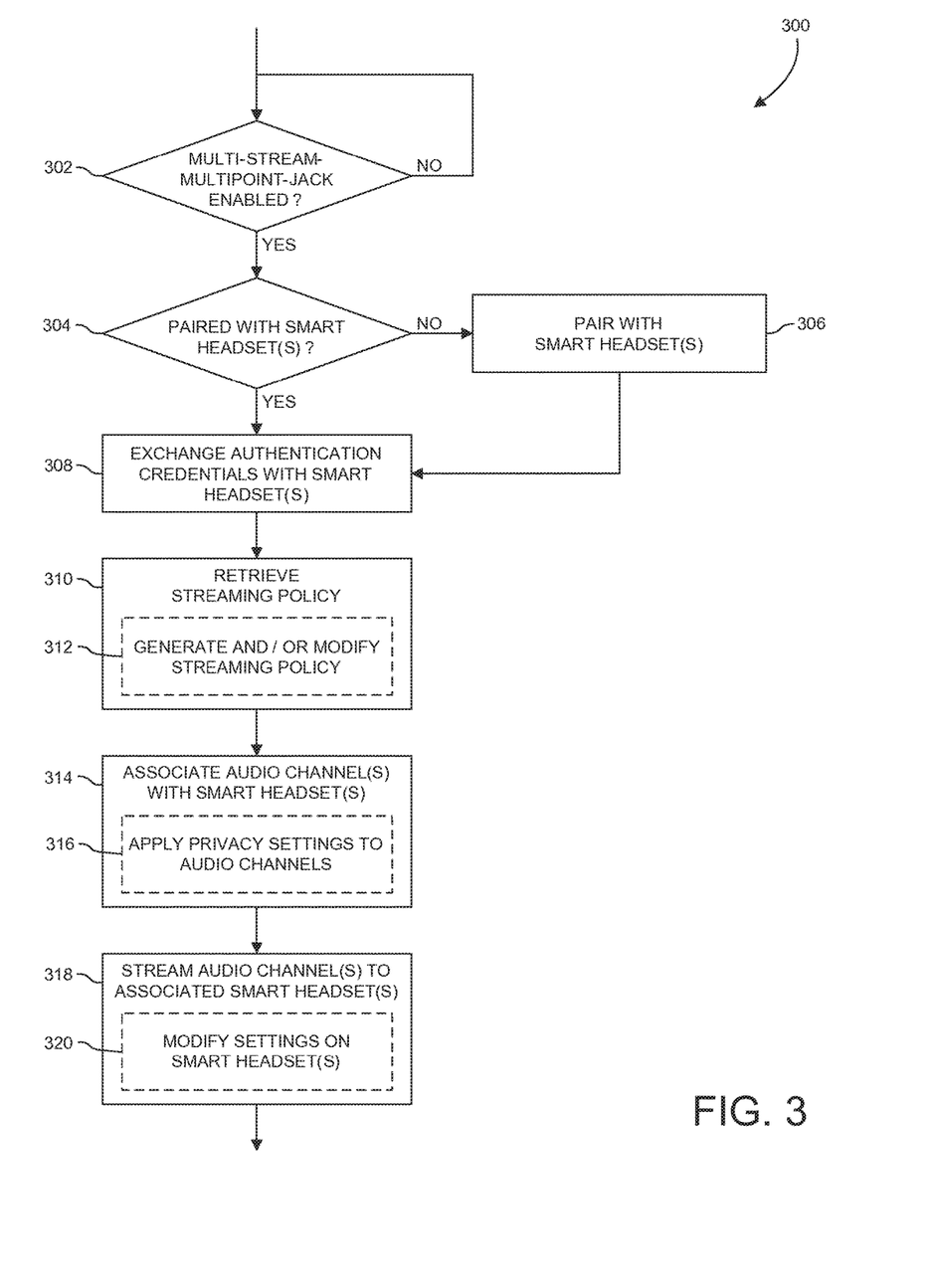
FIG. 3 is a simplified flow diagram of at least one embodiment of a method for streaming the output of one or more audio sources to one or more smart headsets performed by the audio streaming device of FIG. 1.

Referring now to FIG. 3, in use, the audio streaming device 102 may execute a method 300 for streaming the output of the one or more audio sources 130 to the one or more smart headsets 140. The method 300 begins with block 302 in which the audio streaming device determines whether multi-stream-multipoint-jack functionality has been enabled. To do so, the audio streaming device 102 may determine whether a user of the device has invoked multi-stream-multipoint-jack functionality on the audio streaming device 102. In some embodiments, the audio streaming device 102 may detect a signal generated in response to the activation of one or more push-button switches by the user. In such embodiments, the generated signal may be indicative of a request to invoke multi-stream-multipoint-jack functionality on the audio streaming device 102. In some embodiments, the one or more push-button switches may be embodied as physical push-button switches. In other embodiments, however, the one or more push-button switches may be embodied as "soft" switches, capacitive or resistive switches, other electrical-type switches, non-mechanical switches, or other buttons, switches, or other appropriate circuitry usable by a user to interact with the audio streaming device 102. It should be understood that in other embodiments, the audio streaming device 102 may not include push-button switches for requesting activation of multi-stream-multipoint-jack functionality. In such embodiments, the audio streaming device 102 may determine that a user of the device invoked multi-stream-multipoint-jack functionality from one or more selections received from a user interface (UI) displayed on, for example, the display 122, to the user.

In block 304, the audio streaming device 102 may determine whether the device is paired with one or more of the smart headsets 140. In embodiments in which the audio streaming device 102 and the one or more smart headsets 140 comprise short-range transceivers, the one or more smart headsets 140 may be located in proximity to the audio streaming device 102. For example, in one illustrative embodiment, the audio streaming device 102 communicates with the one or more smart headsets 140 using Bluetooth® communication channels. In such embodiments, the one or more smart headsets 140 may be located within a proximity or distance suitable for communicating via Bluetooth communication channels.

The audio streaming device 102 may determine whether the device is already paired with one or more smart headsets 140 located in the vicinity of the device. To do so, the audio streaming device 102 may receive one or more transmissions from a smart headset 140 located in the vicinity of the device. The one or more transmissions may comprise information that identifies the smart headset 140 to the audio streaming device 102. The audio streaming device 102 may use the identity information to determine whether the device previously paired with that particular smart headset 140. If, at block 304, the audio streaming device 102 determines that it is already paired with the one or more smart headsets 140 located in the visibility, the method 300 advances to block 308. Otherwise, the method 300 advances to block 306 in which the audio streaming device 102 performs a pairing procedure with the one or more smart headsets 140.

After pairing with one or more smart headsets 140 located in the vicinity, the audio streaming device 102 joins with the one or more smart headsets 140. To do so, the audio streaming device 102, in block 308, exchanges authentication credentials with the one or more smart headsets 140 and establishes a secure communication channel therebetween. It should be understood that while the audio streaming device 102 exchanges separate authentication credentials with each smart headset 140 to be joined in one illustrative embodiment, the audio streaming device 102 may use any suitable mechanism for exchanging any number of authentication credentials with the one or more smart headsets 140 in other embodiments. Upon joining with the one or more smart headsets 140 in vicinity, the method 300 advances to block 310.

In block 310, the audio streaming device 102 may retrieve a streaming policy from the data storage device 112. In some embodiments, the streaming policy may comprise one or more rules associated with each smart headset 140 joined with the audio streaming device 102. In other embodiments, the streaming policy may comprise one or more rules associated with a group of the smart headsets 140. It should be understood that in some embodiments, the streaming policy and the rules enable a user to selectively direct the streaming of the audio channels to the one or more smart headsets 140. Regardless, the rules of the streaming policy may include output settings, priority settings, privacy settings, and/or any other settings that facilitate streaming output of the one or more audio sources 130 to the one or more smart headsets 140. For example, in some embodiments, a rule of the streaming policy may dictate that two or more audio channels may be simultaneously streamed to a single smart headset 140. In other embodiments, another rule of the streaming policy may dictate that an audio channel being streamed to one or more smart headsets 140 should be blocked while another, higher priority audio channel is being streamed to the same one or more smart headsets 140. Other rules of the streaming policy may dictate that one audio channel should be streamed to a first smart headset 140 while another audio channel should be streamed to a second smart headset 140; that an audio channel may be streamed to one smart headset 140, but should not be streamed to another smart headset 140 to maintain privacy; or that two or more separate audio channels should be mixed and then streamed to one or more of the smart headsets 140.

Additionally or alternatively, the audio streaming device 102 may, in block 312, generate or modify the streaming policy and/or associated rules in some embodiments. For example, in the event that a streaming policy does not exist yet in the data storage device 112, or if rules have not yet been defined for a newly paired smart headset 140, the audio streaming device 102 may provide a user interface to the user. The user may, in those embodiments, interact with the user interface to generate the streaming policy and/or rules for one or more of the smart headsets 140. It should be understood that in some illustrative embodiments, the audio streaming device 102 may provide a user interface to facilitate modifying the streaming policy and/or the rules for the one or more smart headsets 140.

After retrieving the streaming policy from the data storage device 112, the audio streaming device 102 associates, in block 314, one or more audio channels from the one or more audio sources 130 as a function of the streaming policy and the rules associated therewith. To do so, the audio streaming device 102 may map one or more audio channels (e.g. audio outputs) from the audio sources 130 to the one or more smart headsets 140 according to the streaming policy. For example, in an illustrative embodiment, the audio streaming device 102 may associate a first audio channel with two separate smart headsets 140 (i.e. a first smart headset 140 and a second smart headset 140). In another illustrative embodiment, the audio streaming device 102 may associate two separate audio channels with a single smart headset 140 (i.e. the first smart headset 140). It should be understood that in other illustrative embodiments, the audio streaming device 102 may associate the audio channels with the one or more smart headsets 140 in any number of different ways according to the streaming policy.

In some embodiments, the audio streaming device 102 may map one or more audio channels (e.g., audio outputs) to the one or more smart headsets 140 by generating a table or any other suitable data structure for mapping a particular audio channel to a particular smart headset 140. For example, in an illustrative embodiment, the audio streaming device 102 may generate a table comprising a listing of each audio source 130 that is currently connected to the audio streaming device 102; the audio channels (e.g., audio output) available from each connected audio source 130; and the smart headset(s) 140 currently connected to the audio streaming device 102. In some embodiments, the table may also include a unique logical address assigned to each audio source 130 currently connected to the audio streaming device 102; a unique logical address or logical channel number assigned to each smart headset 140 currently connected to the audio streaming device 102; and a unique logical address assigned to each audio channel provided by each audio source 130 currently connected to the audio streaming device 102. In use, the audio streaming device 102 of such embodiments, may utilize the table to map (i.e., associate) a particular audio channel with a particular smart headset 140 using the logical address of the audio channel and the logical channel number of the smart headset 140. It should be understood, however, that any suitable mechanism for mapping any number of audio sources 130 and/or audio channels to any number of smart headsets 140 may be used instead.

As discussed above, in some embodiments, the streaming policy may include rules that define a privacy setting for a particular audio channel or smart headset 140. In block 316, to facilitate enforcing the privacy setting for the particular audio channel, the audio streaming device 102 may apply the privacy setting to the particular audio channel. To do so, the audio streaming device 102 may encrypt the audio channel using one or more encryption keys stored in the memory device 108 and/or the data storage device 112 of the audio streaming device 102 (which may be stored in those devices in an encrypted state). It should be understood that the audio streaming device 102 may use any suitable encryption technique to encrypt the audio channel. For instance, the audio streaming device 102 may use one or more symmetric key algorithms (i.e., shared keys), asymmetric key algorithms (i.e., public/private key pair), or any other suitable encryption mechanism to encrypt the audio channel to ensure privacy. In such embodiments, it should be understood that a corresponding encryption and/or decryption key may be stored on one or more authorized smart headsets 140 in order to decrypt the private audio channel.

Referring back to block 314, after associating the one or more audio channels with the one or more smart headsets 140, the method 300 advances to block 318 in which each audio channel may be streamed to the one or more smart headsets 140 associated therewith. In some illustrative embodiments, the audio streaming device 102 streams each audio channel to each associated smart headset 140 over the secure communication channel established therebetween. To do so, the audio streaming device 102 may encode each audio channel using the authentication credentials for each associated smart headset 140. Upon receipt of the audio channel streamed from the audio streaming device 102, the receiving smart headset 140 may reproduce the sounds generated by a particular audio source 130.

In some embodiments, the audio streaming device 102 may, in block 320, further transmit one or more configuration settings or properties to the smart headsets 140. For example, the audio streaming device 102 may transmit volume properties to one or more of the smart headsets 140. Upon receipt, the one or more smart headsets 140 may apply (i.e., set a preference, modify a setting, etc.) the volume properties of the smart headset. Additionally or alternatively, the audio streaming device 102 may also transmit descriptive information (i.e., the currently connected audio source 130, the title of a song currently being streamed, the name of the audio channel that the user is currently listening to, etc.) corresponding to the audio channel currently being streamed to a particular smart headset 140. It should be understood that any number of configuration settings, properties, commands, and/or information may be sent to the smart headsets 140 by the audio streaming device 102.

Additionally, in some embodiments, the smart headsets 140 comprise functionality for controlling one or more aspects of an audio channel streamed from the audio streaming device 102. For example, one of more of the smart headsets 140 may comprise a Bluetooth Audio/Video Remote Control Profile (AVRCP), which enables the smart headset 140 to control playback (i.e., play, pause, stop, fast forward, reverse, etc.) of the audio channel streamed from the audio streaming device 102. In another illustrative embodiment, the smart headsets 140 may comprise functionality for changing the audio source 130 or the audio channel currently being streamed to a particular smart headset 140. For example, in such embodiments, a particular smart headset 140 may comprise functionality that enables a user to select a new audio source 130 to connect to; select a new audio channel to receive; change to a disc on an audio source 130; skip to the next song in a playlist on an audio source 130; skip to the next song of a compact disc playing on an audio source 130; switch radio stations on an audio source 130; and/or any suitable command for controlling the playback or content being streamed from an audio source 130 by the audio streaming device 102. It should be understood that in such embodiments, the audio streaming device 102 may be used as a proxy between the smart headsets 140 and the audio sources 130. To do so, the audio streaming device 102 may receive the command or playback control request from one or more of the smart headsets 140 and retransmit (e.g., forward) those commands and/or requests to the appropriate audio source 130 for further processing.

While the disclosure has been illustrated and described in detail in the drawings and foregoing description, such an illustration and description is to be considered as exemplary and not restrictive in character, it being understood that only illustrative embodiments have been shown and described

The invention claimed is:

1. An audio streaming device comprising:
   a communication module to establish a secure connection with a smart headset;
   a user interface module to receive a selection of a first audio channel corresponding to a first audio source of a plurality of audio sources and a selection of a second audio channel corresponding to a second audio source of the plurality of audio sources;
   a streaming policy enforcement module to associate the selected first audio channel and the selected second audio channel with the smart headset; and
   a streaming module to stream the selected first audio channel and the selected second audio channel to the smart headset,
   wherein the streaming policy enforcement module is further to block the streaming of the selected first audio channel while streaming the second audio channel to the smart headset in response to a determination that a priority of the selected second audio channel is higher than a priority of the selected first audio channel.

2. The audio streaming device of claim 1, wherein the streaming module is to simultaneously stream the selected first audio channel and the selected second audio channel to the smart headset.

3. The audio streaming device of claim 1, wherein the streaming policy enforcement module is to determine the priority for each of the selected first audio channel and the selected second audio channel.

4. The audio streaming device of claim 3, wherein the streaming module is to stream the selected first audio channel and the selected second audio channel to the smart headset as a function of the priority of the selected first audio channel and the selected second audio channel.

5. The audio streaming device of claim 1, wherein:
   the user interface module is further to receive a selection of a third audio channel corresponding to a third audio source of the plurality of audio sources;
   the streaming policy enforcement module to associate the selected third audio channel with the smart headset; and
   the streaming module to stream the selected first audio channel, the selected second audio channel, and the selected third audio channel to the smart headset.

6. The audio streaming device of claim 1, further comprising an authentication module to exchange an authentication credential with the smart headset, and
   wherein to stream the selected first audio channel and the selected second audio channel comprises to (i) separately encode the selected first audio channel and the selected second audio channel with the authentication credential and (ii) stream each of the encoded first audio channel and the encoded second audio channel to the smart headset.

7. One or more non-transitory, machine readable media comprising a plurality of instructions that, when executed, cause an audio streaming device to:
   establish a secure connection with a smart headset;
   receive a selection of a first audio channel corresponding to a first audio source of a plurality of audio sources and a selection of a second audio channel corresponding to a second audio source of the plurality of audio sources;
   associate the selected first audio channel and the selected second audio channel with the smart headset;
   stream the selected first audio channel and the selected second audio channel to the smart headset; and
   block the streaming of the selected first audio channel while streaming the second audio channel to the smart headset in response to a determination that a priority of the selected second audio channel is higher than a priority of the selected first audio channel.

8. The one or more non-transitory, machine readable media of claim 7, wherein to stream the selected first audio channel and the selected second audio channel comprises to simultaneously stream the selected first audio channel and the selected second audio channel to the smart headset.

9. The one or more non-transitory, machine readable media of claim 7, wherein the plurality of instructions, when executed, further cause the audio streaming device to determine the priority for each of the selected first audio channel and the selected second audio channel.

10. The one or more non-transitory, machine readable media of claim 9, wherein to stream the selected first audio channel and the selected second audio channel comprises to stream the selected first audio channel and the selected second audio channel to the smart headset as a function of the priority of the selected first audio channel and the selected second audio channel.

11. The one or more non-transitory, machine readable media of claim 7, wherein the plurality of instructions, when executed, further cause the audio streaming device to:
    receive a selection of a third audio channel corresponding to a third audio source of the plurality of audio sources;
    associate the selected third audio channel with the smart headset; and
    stream the selected first audio channel, the selected second audio channel, and the selected third audio channel to the smart headset.

12. The one or more non-transitory, machine readable media of claim 7, wherein the plurality of instructions, when executed, further cause the audio streaming device to exchange an authentication credential with the smart headset, and
    wherein to stream the selected first audio channel and the selected second audio channel comprises to (i) separately encode the selected first audio channel and the selected second audio channel with the authentication credential and (ii) stream each of the encoded first audio channel and the encoded second audio channel to the smart headset.

13. A method comprising:
    establishing, by an audio streaming device, a secure connection with a smart headset;
    receiving, by the audio streaming device, a selection of a first audio channel corresponding to a first audio source of a plurality of audio sources and a selection of a second audio channel corresponding to a second audio source of the plurality of audio sources;
    associating, by the audio streaming device, the selected first audio channel and the selected second audio channel with the smart headset;
    streaming, by the audio streaming device, the selected first audio channel and the selected second audio channel to the smart headset; and
    blocking the streaming of the selected first audio channel while streaming the second audio channel to the smart headset in response to a determination that a priority of the selected second audio channel is higher than a priority of the selected first audio channel.

14. The method of claim 13, wherein streaming the selected first audio channel and the selected second audio channel comprises simultaneously streaming the selected first audio channel and the selected second audio channel to the smart headset.

15. The method of claim 13, further comprising determining, by the audio streaming device, the priority for each of the selected first audio channel and the selected second audio channel.

16. The method of claim 15, wherein streaming the selected first audio channel and the selected second audio channel comprises streaming the selected first audio channel and the selected second audio channel to the smart headset as a function of the priority of the selected first audio channel and the selected second audio channel.

17. The method of claim 13, further comprising exchanging an authentication credential with the smart headset, and
   wherein streaming the selected first audio channel and the selected second audio channel comprises (i) separately encoding the selected first audio channel and the selected second audio channel with the authentication credential and (ii) streaming each of the encoded first audio channel and the encoded second audio channel to the smart headset.

\* \* \* \* \*